(12) United States Patent
Gahleitner et al.

(10) Patent No.: US 10,995,205 B2
(45) Date of Patent: May 4, 2021

(54) BIMODAL POLYPROPYLENE RANDOM COPOLYMER

(71) Applicant: BOREALIS AG, Vienna (AT)

(72) Inventors: Markus Gahleitner, Linz (AT); Jingbo Wang, Linz (AT); Klaus Bernreitner, Linz (AT); Daniela Mileva, Linz (AU); Matthias Hoff, Linz (AT); Pauli Leskinen, Porvoo (FI)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 16/982,915

(22) PCT Filed: Apr. 9, 2019

(86) PCT No.: PCT/EP2019/058914
§ 371 (c)(1),
(2) Date: Sep. 21, 2020

(87) PCT Pub. No.: WO2019/197384
PCT Pub. Date: Oct. 17, 2019

(65) Prior Publication Data
US 2021/0017368 A1 Jan. 21, 2021

(30) Foreign Application Priority Data
Apr. 10, 2018 (EP) .................... 18166466

(51) Int. Cl.
| | | |
|---|---|---|
| *C08L 23/08* | (2006.01) | |
| *C08L 23/14* | (2006.01) | |
| *C08F 2/00* | (2006.01) | |
| *C08F 2/02* | (2006.01) | |
| *C08F 2/34* | (2006.01) | |
| *C08F 110/06* | (2006.01) | |

(52) U.S. Cl.
CPC ............ *C08L 23/142* (2013.01); *C08F 2/001* (2013.01); *C08F 2/02* (2013.01); *C08F 2/34* (2013.01); *C08F 110/06* (2013.01); *C08L 23/08* (2013.01); *C08L 2203/02* (2013.01); *C08L 2205/025* (2013.01); *C08L 2308/00* (2013.01); *C08L 2310/00* (2013.01); *C08L 2314/06* (2013.01)

(58) Field of Classification Search
CPC .... C08L 23/08; C08L 23/142; C08L 2203/02; C08L 2206/025; C08L 2308/00; C08L 2310/00; C08L 2314/06; C08F 2/001; C08F 2/02; C08F 2/34; C08F 110/08
See application file for complete search history.

(56) References Cited

U.S. PATENT DOCUMENTS

2017/0233566 A1   8/2017   Datta et al.

FOREIGN PATENT DOCUMENTS

| | | | |
|---|---|---|---|
| EP | 0887379 B1 | 12/1998 | |
| EP | 1711557 B1 | 10/2006 | |
| EP | 1778782 B1 | 5/2007 | |
| EP | 1881027 A1 | 1/2008 | |
| EP | 2287246 B1 | 2/2011 | |
| EP | 2746336 A1 * | 6/2014 | ............. C08L 23/12 |
| EP | 2978782 B1 | 2/2016 | |
| EP | 3006472 A1 | 4/2016 | |
| WO | 92/12182 A1 | 7/1992 | |
| WO | 2013/007650 A1 | 1/2013 | |
| WO | 2014/187687 A1 | 11/2014 | |
| WO | 2016/055361 A1 | 4/2016 | |
| WO | 2016/116606 A1 | 7/2016 | |

OTHER PUBLICATIONS

Busico, Vincenzo, et al., "Alk-1-Ene Polymerization in the Presence of a Monocyclopentadienyl Zirconium(IV) Acetamidinate Catalyst: Microstructural and Mechanistic Insights", Macromol. Rapid Commun. 2007, 28, 1128-1137.
Cheng, et al., "13C NMR Analysis of Ethylene-Propylene Rubbers", Macromolecules 17, 1984, 1950-1955.
Singh, Gurmeet, et al., "Triad Sequence Determination of Ethylene-Propylene Copolymers-Application of Quantitative 13C NMR", Polymer Testing 28 (2009) 475-479.
Zhou, Zhe, et al., "A New Decoupling Method for Accurate Quantification of Polyethylene Copolymer Composition and Triad Sequence Distribution With 13C NMR", Journal of Magnetic Resonance 187 (2007) 225-233.
Drongelen, Martin Van, et al., "Microfocus wide angle Xray scattering of polymers crystallized in a fast scanning chip calorimeter", Thermochica Acta 563 (2013) 33-34.
Iervolino, E., et al., "Temperature calibration and electrical characterization of the differential scanning alorimeter chip UFS1 for the Mettler-Toledo Flash DSC 1", Thermoochimica Acto XXX (2001).
Jonsson, Jan Ake, "Nomenclature for Non-Linear Chromatography", Pur & Appl. Chem., vol. 68, No. 8, pp. 1591-1595, 1996.
Mathot, Vincent, "The Flash DSC 1, a power compensation twin-type, chip-based Fast Scanning Calorimeter (FSC): First findings on polymers", Thermochimica Acta (2008), doi:10.1016/0cal011.02. 031.
Indian Office Action dated Feb. 26, 2021.

* cited by examiner

*Primary Examiner* — Nathan M Nutter
(74) *Attorney, Agent, or Firm* — Tarolli, Sundheim, Covell & Tummino LLP

(57) ABSTRACT

The application provides a bimodal polypropylene random copolymer with good response to nucleating agents, increased crystallization temperature, good mechanical and optical properties, as well as low amounts of extractables and good processability in the sense of high Melt Flow Rate. The present invention further relates to articles made thereof, and the use of the bimodal polypropylene random copolymer for specific applications. It also relates to a process for the preparation of said bimodal polypropylene random copolymer.

11 Claims, No Drawings

BIMODAL POLYPROPYLENE RANDOM COPOLYMER

The present invention provides a bimodal polypropylene random copolymer with good response to nucleating agents, increased crystallization temperature, good mechanical and optical properties, as well as low amounts of extractables and good processability in the sense of high Melt Flow Rate.

The present invention further relates to articles made thereof, and the use of the bimodal polypropylene random copolymer for specific applications. It also relates to a process for the preparation of said bimodal polypropylene random copolymer.

BACKGROUND INFORMATION

Polypropylene random copolymers are widely used in injection moulding applications, especially for producing packaging articles, as they are well known and appreciated for their mechanical and optical properties as well as their very convenient processing.

Typical applications are e.g. thin wall packaging, houseware applications, containers for food and other packaging issues, etc.

Said polypropylene random copolymers are often further modified with various nucleating agents to increase the crystallization temperature, improve the optical properties, like haze or improve mechanical properties like stiffness. A high crystallization temperature is also desired to allow faster conversion and consequently a reduction of cycle time, e.g. in injection moulding.

Several attempts have been made to improve mechanical or optical behaviour of such propylene random copolymers. However, it is well known and acknowledged in the art, that these properties are strongly linked with each other. Accordingly improving the one is often at the expense of the other.

This is even more true, as soon as migration aspects and/or purity have to be considered.

Single-site catalysts are well known in the field of producing polypropylene.

They are increasingly used for copolymerization of propylene with other comonomers, due to their highly random insertion of the comonomer units along the chain. A highly random comonomer insertion improves the optical behaviour. The inherently narrow molecular weight distribution (MWD) resulting from polymerization with said single-site catalysts furthermore reduces the amount of extractable fractions.

Said highly random comonomer insertion of single-site based polypropylenes however can cause disadvantages for mechanical properties of the final polymer: based on this highly random comonomer distribution, these polypropylene grades tend to become much less stiff than Ziegler-Natta grades at a similar comonomer content, nevertheless providing lower impact behaviour. Said stiffness reduction is aggravated by the aforementioned narrow MWD.

Furthermore, the main drawback of polypropylene random copolymers produced via single-site catalysis is their worse nucleation response: This is expressed in lower crystallization temperatures than observed in polymers produced via Ziegler-Natta catalysis and having similar polymer characteristics as e.g. comonomer content and type, amount of soluble fractions, etc.

It is further known, that very high cooling rates (i.e. 100 K/sec or above) suppress the crystallization of the stable monoclinic phase of polypropylene. Instead polypropylene solidifies in its less stable mesomorphic phase.

Cooling rates higher than 100 K/s lead to a decrease of the crystallization temperature of the monoclinic α-structure from about 120 to 70° C. respectively. At rates above 90 K/s a second exothermic event at a lower temperature of about 30° C. is observed. The low temperature exothermic event is related to the formation of a second ordered phase, the mesomorphic phase. Further increase of cooling rate to above about 300 K/s completely suppresses the crystallization of monoclinic α-structure and revealed only the formation of mesomorphic phase. The suppression of the monoclinic phase formation at high cooling rates results in decrease of the crystallinity of the polypropylene from 50-60% to 20-30%. This effect is known as "quenching".

It is further well known and documented, that the above mentioned quenching takes place regardless if the polypropylene comprises nucleating agents like Bis-(3,4-dimethylbenzylidene)sorbitol or not:

It is also known in the art that an increasing comonomer content as well as an increase of the MFR promotes the tendency for quenching and accordingly decreases the solidification temperature (Ts) at given cooling rates.

DESCRIPTION OF THE PRIOR ART

It was reported that both α- and β-nucleation response is worse in polypropylene copolymers produced via single-site catalysis, although the respective homopolymers have almost the same crystallization behaviour as those based on heterogeneous Ti-halogenide (Ziegler-Natta) catalysts (*Journal of Thermal Analysis and calorimetry*, 59 (2000) 483-495).

EP 1711557 B1 claims a polymeric blend comprising (a) a first PP, having an average melt temperature $T_{M1}$, and a melt flow rate $MFR_1$, and (b) a second PP having an average melt temperature $T_{M2}$, and a melt flow rate $MFR_2$, characterised in that said polymeric blend has an average melt temperature $T_{Mb}$ of 125-160° C., a melt flow rate $MFR_b$ of 10-40 g/10 minutes, and specific relation of the melting temperatures of the first and the second PP. The target application are fibres.

The patent does not disclose nucleated compositions.

EP 1778782 B1 claims a process for producing clear injection stretch blow molded containers comprising (I) molding a propylene polymer composition comprising (A) a propylene polymer consisting of (i) ~25-~75 wt.-% of a homopolymer having an isotactic index greater than about 80 wt.-%; and (ii) ~25-~75 wt.-% of a random copolymer of propylene and at least one olefin chosen from ethylene and C4-C10 α-olefins, containing about 0.3 to about 30 wt.-% of the olefin, and having an isotactic index greater than about 60 wt.-%, the propylene polymer having a melt flow rate of from about 1 to about 50; and (B) ~1-~1000 ppm of at least one radiant heat absorbent that absorbs infrared radiation having a radiation wavelength of from ~700-~25,000 nm thereby forming a preform; and (II) stretch blow molding the preform after heating by infrared radiation; the containers have a haze value less than 25.0%. The patent does not indicate crystallizations temperatures, and the comonomer content of fraction (ii) is defined in such a wide range that also heterophasic copolymers are covered.

EP 2978782 B1 covers propylene copolymers (R-PP) having (a) a melt flow rate MFR2 (230° C.) measured according to ISO 1133 in the range of more than 2.5 to 15.0 g/10 min, (b) a comonomer content in the range of 2.0 to below 12.0 mol.-%, (c) a melting temperature in the range of 125 to below 143° C., (d) a xylene cold soluble fraction (XCS) in the range of 17.0 to 45.0 wt.-%, and (e) a molecular weight distribution (Mw/Mn) of at least 2.7; and/or a polydispersity index (PI) of at least 2.3. The patent does not indicate any crystallization temperatures. Further, the invention is exemplified with a polymer having a comonomer content of above 2.8 wt.-% in the first fraction and a comonomer content of above 11.2 wt.-% in the GPR-fraction.

EP 2287246 B1 covers a polyolefin resin composition comprising a polyolefin resin having an MFR at 230° C. of 20 dg/min or more, (A) a dibenzylidene sorbitol compound (e.g. DMDBS) and (B) an alkali metal salt compound of organic phosphoric acid ester (e.g. NA-11). This application is not concerned with crystallization temperatures or specific polypropylene random copolymers.

WO2016055361 discloses quenching resistant α-nucleated crystalline polypropylene produced via Ziegler-Natta-catalysis and based on polymeric nucleating agents. This application is not concerned with bimodal polypropylene random copolymers produced in the presence of a single site based catalyst.

OBJECT OF THE INVENTION

So it has been an object of the present invention to provide a polypropylene random copolymer produced in the presence of a single site based catalyst, having good response to nucleating agents and low quenching when exposed to high cooling rates.

It was a further object to provide a bimodal polypropylene random copolymer having improved i.e. increased crystallization temperature, as well as good mechanical and optical properties.

Furthermore it was targeted to achieve a bimodal polypropylene random copolymer having low amounts of extractables and good processability in the sense of high Melt Flow Rate.

The inventors have identified a bimodal polypropylene random copolymer of propylene and 2.5-7.0 wt.-% of ethylene as comonomer produced in the presence of a single site based catalyst, having a Melt Flow Rate of 20.0-120.0 g/10 min when determined according to ISO1133 at 230° C. and 2.16 kg and comprising
a) 25.0-70.0 wt.-% of a first polypropylene fraction being a propylene homopolymer or a random copolymer of propylene and ethylene as comonomer comprising up to 2.0 wt.-% of comonomer and
b) 30.0-75.0 wt.-% of a second polypropylene fraction being a random copolymer of propylene and ethylene as comonomer comprising 3.0-10.0 wt.-% of comonomer, and wherein the bimodal polypropylene random copolymer is characterised by a Crystallization Temperature (Tc) of at least 115° C.

In a preferred embodiment the invention covers moulded articles comprising the bimodal polypropylene random copolymer of the present invention.

In a further, alternatively preferred embodiment, the invention covers the use of the bimodal polypropylene random copolymer for producing moulded articles, preferably intended for medical, pharmaceutical or diagnostic purposes as well as the use of such articles for medical, pharmaceutical or diagnostic purposes.

DETAILED DESCRIPTION

Bimodal Polypropylene Random Copolymer

The present invention discloses a bimodal polypropylene random copolymer having a crystallization temperature of at least 115° C. and may optionally comprise at least one, preferably at least two nucleating agents.

Accordingly the bimodal polypropylene random copolymer of the present invention is understood to be a nucleated bimodal polypropylene random copolymer.

The term "random copolymer" has to be preferably understood according to IUPAC (Pure Appl. Chem., Vol. No. 68, 8, pp. 1591 to 1595, 1996).

Accordingly it is preferred that the bimodal polypropylene random copolymer does not contain elastomeric (co)polymers forming inclusions as a second phase for improving mechanical properties. A polymer containing elastomeric (co)polymers as insertions of a second phase would by contrast be called heterophasic and is preferably not part of the present invention. The presence of second phases or the so called inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Accordingly it is preferred that the bimodal polypropylene random copolymer (R-PP) according to this invention has solely glass transition temperature(s) of above −30° C., preferably above −25° C., more preferably above −20° C.

The bimodal polypropylene random copolymer of the present invention may have a melt flow rate $MFR_2$ (230° C.) measured according to ISO 1133 in the range of 20.0-120.0 g/10 min, preferably in the range of 25.0-100.0 g/10 min, like the range of 30.0-90.0 g/10 min.

The bimodal polypropylene random copolymer of the present invention comprises 2.5-7.0 wt.-% ethylene as comonomer. Preferably the comonomer content may be in the range of 3.0-6.5 wt.-%, such as 3.6-6.0 wt.-%.

The bimodal polypropylene random copolymer of the present invention comprises low amounts of fractions soluble in cold xylene (XCS). The amount of XCS may be in the range of 1.0-15.0 wt.-%, preferably in the range of 1.5-13.0 wt.-%, like 2.0-11.0 wt.-%.

The bimodal polypropylene random copolymer may have an average molecular weight (Mw) of 100-500 kg/mol, preferably in the range of 120-400 kg/mol, more preferably in the range of 140-350 kg/mol.

The bimodal polypropylene random copolymer has an crystallization temperature Tc of at least 115° C. The crystallization temperature may be preferably at least 117° C. or higher such as at least 123° C. The crystallization temperature may be up to 130° C.

The bimodal polypropylene random copolymer may further have a molecular weight distribution (Mw/Mn) in the range of 2.0 to 4.0, like in the range of 2.4 to 3.6

The bimodal polypropylene random copolymer of the present invention may have at least two distinct melting temperatures, namely a first melting temperature (Tm1) and a second melting temperature (Tm2).

The first melting temperature (Tm1) may be at least 135° C. or higher, preferably in the range of 135-160°, more preferably in the range of 145-155° C.

The second melting temperature may be at most 145° C. or below, preferably in the range of 105-140° C., more preferably in the range of 110-137° C.

It is understood that first melting temperature Tm1 indicates the higher melting temperature, whereas the second melting temperature Tm2 indicates the lower melting temperature.

The bimodal polypropylene random copolymer of the present invention may further be characterised by specific melt enthalpies (Hm) of the two melting peaks.

It is understood that the melt enthalpy of the first melting peak (Hm1) is associated with the higher melting temperature (Tm1), whereas the melt enthalpy of the second melting peak (Hm2) is associated with the lower melting temperature (Tm2).

Preferably, the bimodal polypropylene random copolymer of the present invention has a melt enthalpy Hm1 of at most 80 J/g, preferably in the range of 10.0-60.0 J/g, more preferably in the range of 15.0-50.0 J/g.

It is equally preferred, that the melt enthalpy Hm2 of the bimodal polypropylene random copolymer may be at least 30.0 J/g, preferably in the range of 30.0-100, like 33.0-80 J/g.

In particular, the bimodal polypropylene random copolymer may be characterised by specific values for the melt enthalpies and especially by a specific ratio of the melt enthalpies of the two melting peaks. The ratio of the second to the first melt enthalpy (Hm2/Hm1) may be at least 0.80, preferably in the range of 0.80 to 5.0, more preferably in the range of 0.90 to 4.0, like even more preferably in the range of 0.80 to 2.0 or in the range of 2.0 to 4.0.

The bimodal polypropylene random copolymer of the present invention can further be characterised by its way of comonomer insertion, especially by the normated amount of <PEP>-triads:

The bimodal polypropylene random copolymer of the present invention may have a normated amount of <PEP>-triads of at most 66.0% or lower, such as 35.0-65.0%, preferably 38.0-63.0%.

The bimodal polypropylene random copolymer is characterised by its specific and improved nucleation response, expressed by crystallization of monoclinic α-structure even at high cooling rates of e.g. 100 K/sec or above.

The bimodal polypropylene random copolymer of the present invention comprises at least two polypropylene fractions, preferably a first and a second polypropylene fraction, which may differ in view of the viscosity, their comonomer content or both. It is preferred, that the bimodal polypropylene random copolymer of the present invention is bimodal in view of its comonomer content.

Accordingly it is preferred, that the first polypropylene fraction differs from the second polypropylene fraction in view of its comonomer content. Preferably, the comonomer content of the second polypropylene fraction is higher than the comonomer content of the first polypropylene fraction.

It is envisaged in the scope of the invention, that a mixture comprising the first and the second polypropylene fraction results in a bimodal polypropylene random copolymer having a comonomer content in the range of 2.5-7.0 wt.-%.

It is further preferred, that the bimodal polypropylene random copolymer comprises, more preferably consists of two polypropylene fractions and additionally one or more nucleating agents and optionally any further commonly used additive, such as antioxidants, acid scavengers, UV-stabilisers or lubricants up to 5 wt.-%. Preferably the additive content (without any soluble nucleating agents) is below 3.0 wt.-%, like below 1.0 wt.-%.

It is understood within the present invention, that commonly used additives, such as antioxidants, acid scavengers, UV-stabilisers or lubricants up to 5 wt.-% may be present, even if the polymer is described as "consisting of two polypropoylene fractions".

P1 (Embodiment 1)

In a particular preferred first embodiment, the bimodal polypropylene random copolymer comprises a) 30.0-60.0 wt.-%, preferably 40.0-55.0 wt.-% of a first polypropylene fraction being a random copolymer of propylene and ethylene as comonomer, said random copolymer comprising 0.5-2.0 wt.-% of comonomer and
b) 40.0-70.0 wt.-%, preferably 45.0-60.0 wt.-% of a second polypropylene fraction being a random copolymer of propylene and ethylene as comonomer, comprising 3.0-7.5 wt.-% of comonomer,
c) at least one or more nucleating agents and
d) a Crystallization Temperature (Tc) in the range of 115-125° C., preferably in the range of 116-122° C., and has a total comonomer content of 2.5-5.0 wt.-%, preferably 3.0-4.5 wt.-% and optionally 1.0-6.0 wt.-%, like 1.5-5.5 wt.-%. of a fraction soluble in cold xylene (XCS).

P2 (Embodiment 2)

In one alternatively preferred second embodiment the bimodal polypropylene random copolymer comprises a) 25.0-55.0 wt.-%, preferably 30.0-45.0 of a first polypropylene fraction being a propylene homopolymer,
b) 45.0-75.0 wt.-%, preferably 55.0-70.0 of a second polypropylene fraction being a random copolymer of propylene and ethylene as comonomer, comprising 4.0-10.0 wt.-% of comonomer,
c) at least one or more nucleating agents and
d) a Crystallization Temperature (Tc) in the range of 120-130° C., preferably 123-128° C., wherein the bimodal polypropylene random copolymer is characterised by a total comonomer content of 3.0-7.0 wt.-%, preferably 3.6-6.5 wt.-% and optionally by 5.0-15.0 wt.-%, such as 5.5-13.0 wt.-% of a fraction soluble in cold xylene (XCS).

First Polypropylene Fraction

The first polypropylene fraction may have a melt flow rate (MFR 230/2.16) according to ISO 1133 in the range of 1.0-70.0 g/10 min, preferably in the range of 10.0 to 55.0 g/10 min, like the range of 15.0 to 40.0 g/10 min or 20.0-35.0 g/10 min.

The first polypropylene fraction may be a random copolymer of propylene and ethylene or a propylene homopolymer.

The comonomer content of the first polypropylene fraction differs from the second polypropylene fraction. The first polypropylene fraction may comprise less comonomer than the second polypropylene fraction or none at all.

The comonomer content of the first polypropylene fraction may be in the range of 0.0-2.0 wt.-%, preferably in the range of 0.8-1.8 wt.-%, such as 1.0-1.6 wt.-%.

In an equally preferred embodiment the comonomer content of the first polypropylene fraction is 0.0 wt.-%.

The first polypropylene fraction of the bimodal polypropylene random copolymer may have an average molecular weight (Mw) of 100-600 kg/mol, preferably in the range of 120-400 kg/mol, more preferably in the range of 135-350 kg/mol.

The first polypropylene fraction of the bimodal polypropylene random copolymer may further have a molecular weight distribution (Mw/Mn) in the range of 2.0 to 4.0, like in the range of 2.4 to 3.6

Preferably the weight ratio between first polypropylene fraction and the second polypropylene fraction is 20/80 to 80/20, more preferably 30/70 to 70/30, like 35/65 to 65/35 or 45/55 to 55/45.

Second Polymer Fraction

The second polypropylene fraction may have a melt flow rate (MFR 230/2.16) in a similar range as the first polypropylene fraction. Hence it may be in the range of 1.0-70.0 g/10 min, preferably in the range of 10.0 to 55.0 g/10 min, like 15.0 to 40.0 g/10 min or 20.0-35.0 g/10 min.

The melt flow rate (MFR 230/2.16) of the second polypropylene fraction may also differ from the melt flow rate (MFR 230/2.16) of the first polypropylene fraction.

The second polypropylene fraction of the bimodal polypropylene random copolymer may have an average molecular weight (Mw) of 100-600 kg/mol, preferably in the range of 120-400 kg/mol, more preferably in the range of 135-350 kg/mol.

The second polypropylene fraction of the bimodal polypropylene random copolymer may further have a molecular weight distribution (Mw/Mn) in the range of 2.0 to 4.0, like in the range of 2.4 to 3.6

The second polypropylene fraction is characterised by a higher comonomer content than the first polypropylene fraction. Preferably, the comonomer content of the second polypropylene fraction may be in the range of 3.0-10.0 wt.-%, like preferably 3.5-9.0 wt.-% m more preferably in the range of 4.0-7.5 wt.-%.

Furthermore it is preferred, that the comonomer content of the second polypropylene fraction, Co(2), and the comonomer content of the final bimodal polypropylene random copolymer, Co(tot), fulfil together the inequation (Ia), preferably (Ib), more preferably (Ic). Co(2) is the comonomer content [wt.-%] of the second propylene copolymer fraction, Co(tot) is the comonomer content [wt.-%] of the second propylene copolymer fraction.

$$1.0 \leq \frac{Co(2)}{Co(tot)} \leq 4.0 \quad \text{(I a)}$$

$$1.2 \leq \frac{Co(2)}{Co(tot)} \leq 3.0 \quad \text{(I b)}$$

$$1.3 \leq \frac{Co(2)}{Co(tot)} \leq 2.5 \quad \text{(I c)}$$

Nucleating Agent:

The bimodal polypropylene random copolymer of the present invention may comprise at least one, preferably at least two nucleating agents.

In case of at least two nucleating, they preferably differ in their physical appearance.

It is especially preferred, that the bimodal polypropylene random copolymer comprises a first nucleating agent, being a soluble nucleating agent and a second nucleating agent, being a particulate nucleating agent. The difference between soluble and particulate nucleating agents is well known in the field and explained for example in Gahleitner et al., International Polymer Processing 26 (2011) 2-20.

The soluble nucleating agent according the present invention may be selected from the group (i) consisting of:
(i) soluble nucleating agents, like sorbitol derivatives, e.g. di(alkylbenzylidene)sorbitols as 1,3:2,4-dibenzylidene sorbitol, 1,3:2,4-di(4-methylbenzylidene) sorbitol, 1,3:2,4-di (4-ethylbenzylidene) sorbitol and 1,3:2,4-Bis(3,4-dimethylbenzylidene) sorbitol, as well as nonitol derivatives, e.g. 1,2,3-trideoxy-4,6; 5,7-bis-O-[(4-propylphenyl)methylene] nonitol, and benzene-trisamides like substituted 1,3,5-benzenetrisamides as N,N',N''-tris-tert-butyl-1,3,5-benzenetricarboxamide, N,N',N''-tris-cyclohexyl-1,3,5-benzene-tricarboxamide and N-[3,5-bis-(2,2-dimethyl-propionylamino)-phenyl]-2,2-dimethyl-propionamide, wherein 1,3:2,4-Bis(3, 4-dimethylbenzylidene) sorbitol and N-[3,5-bis-(2,2-dimethyl-propionylamino)-phenyl]-2,2-dimethyl-propionamide are equally preferred, and 1,3:2,4-Bis(3,4-dimethylbenzylidene) sorbitol is especially preferred.

The particulate nucleating agent according the present invention may be selected from the groups (ii, iii and iv) consisting of:
(ii) salts of monocarboxylic acids and polycarboxylic acids, e.g. sodium benzoate or aluminum tert-butylbenzoate;
(iii) salts of diesters of phosphoric acid, e.g. sodium 2,2'-methylenebis (4,6-di-tert-butylphenyl) phosphate or aluminium-hydroxy-bis[2,2'-methylene-bis(4,6-di-t-butylphenyl)phosphate], and hydroxybis (2,4,8,10-tetra-tert-butyl-6-hydroxy-12Hdibenzo(d,g)(1,3,2) dioxaphosphocin 6-oxidato) aluminium, wherein hydroxybis (2,4,8,10-tetra-tert-butyl-6-hydroxy-12H-dibenzo(d,g)(1,3,2) dioxaphosphocin 6-oxidato) aluminium is preferred; and
(iv) polymeric nucleating agents, such as polymerized vinyl compounds, in particular vinyl cycloalkanes, like vinyl cyclohexane (VCH), poly(vinyl cyclohexane) (PVCH), poly (vinyl cyclopentane) (PVCP), and vinyl-2-methyl cyclohexane, 3-methyl-1-butene, 3-ethyl-1-hexene, 3-methyl-1-pentene, 4-methyl-1-pentene or mixtures thereof. PVCH and PVCP are particularly preferred.

It is preferred that the particulate nucleating agent comprised in the bimodal polypropylene random copolymer of the present invention is selected from the group of polymeric nucleating agents (iv) of above list.

Accordingly is preferred that the two nucleating agents are selected from group (i) and group (iv). It is especially preferred, that the first nucleating is a sorbitol based nucleating agent, namely 1,3:2,4-Bis(3,4-dimethylbenzylidene) sorbitol and the second nucleating is a polymeric nucleating agent, especially PVCH or PVCP.

The soluble nucleating agent may be present in the bimodal polypropylene random copolymer in amounts of between 100-3000 ppm based on the total weight of the bimodal polypropylene random copolymer, preferably 1000-2500 ppm, such as 1500-2200 ppm.

The particulate nucleating agent may be present in ranges of 0.1 to 3000 ppm, like 0.3-2200 ppm, or like 0.5-1500 ppm.

Further preferred ranges for the particulate nucleating agent are 50-2000 ppm, like 150-1500 or 250-1000 ppm.

In a preferred embodiment the particulate nucleating agent is polymeric and present in the range of 0.1 ppm to 50 ppm, preferably in the range of 0.3-30 ppm, more preferably in the range of 0.5 to 20 ppm, based on the total weight of the bimodal polypropylene random copolymer.

The particulate nucleating agent may be incorporated into the bimodal polypropylene random copolymer by any conventional method, like as pure substance, blended with other components or via masterbatch technology.

In case the particulate nucleating agent is select from the group of polymeric nucleating agents, then it is preferably incorporated via Masterbatch technology:

The polymer is first produced in the absence of a polymeric nucleating agent and is then blended mechanically with polymers, which already contain the polymeric nucleating agent in order to introduce the polymeric nucleating agent into the polymer mixture. The preparation of a reactor made polymer composition ensures the preparation of a homogenous mixture of the components, for example a homogenously distributed polymeric nucleating agent in the polypropylene homopolymer, even at high or very low concentrations of polymer nucleating agent.

It is envisaged in the present invention, that the masterbatch comprising the polymeric nucleating may also comprise further additives, like stabilizers, or other nucleating agents, such as the soluble nucleating agent.

The amount of the polymeric nucleating agent within the masterbatch may be in a range of 10-150 ppm, like 20-80 ppm. The amount of the masterbatch in the bimodal polypropylene random copolymer can be in the range of 0.5-20 wt.-%, like 1.0-15.0 or 1.5-10 wt.-%.

The amount of polymeric nucleating agent in the bimodal polypropylene random copolymer may be in the range of 0.1 ppm to 50 ppm, preferably in the range of 0.3-30 ppm, more preferably in the range of 0.5 to 20 ppm.

The ratio between the soluble nucleating agent to the particulate nucleating agent may be in the range of 100-100.000, more preferably in the range of 1000 to 20.000, most preferably in a range of 2000 to 10.000, like from 2000 to 5000.

Physical Properties of the Polymer

All the properties of the inventive polymers have been determined according to the Measuring Methods given in further below.

Flexural Modulus

The bimodal polypropylene random copolymer of the present invention may have a Flexural Modulus determined according to ISO 178 of at least 800 MPa, such as in the range of 800-2000 MPa.

Preferably, the Flexural Modulus may be in the range of, like 900 MPa to 1500 MPa, or from 900 to 1300 MPa, more preferably in the range of 950 to 1150 MPa.

The Notched impact strength (NIS) is determined according to ISO179/+23° C. and may be at least 2.0 kJ/m$^2$. It may be in the range of 2.5 to 10.0 kJ/m$^2$, such as in the range of 3.0 to 8.0 kJ/m$^2$.

The bimodal polypropylene random copolymer of the present invention is characterised by a low Haze on 1 mm injection moulded plaques according to ASTM D1003. Said Haze values determined on 1 mm injection moulded plaques is denominated as Haze$_1$.

The bimodal polypropylene random copolymer of the present invention may have a Haze$_1$ of at most 20.0%, such as 3.0-15.0%, like 4.0-12.0%, such as 5.0-10.5%.

The bimodal polypropylene random copolymer of the present invention can be characterised by low amounts of polymer soluble in hexane (C6 FDA).

The amount of polymer soluble in hexane (C6 FDA) may be below 2.5 wt.-%, such as in the range of 0.1 to 2.5 wt.-%, like 0.5 to 2.3 wt.-%, preferably 0.7 to 2.1 wt.-%.

The bimodal polypropylene random copolymer of the present invention can be also characterised by a low overall migration level (OM) when measured on injection moulded plaques according to EN ISO 1186-14:2002.

The overall migration (OM) may be in the range of at most 10.0 mg/dm$^2$, like 1.0 to 10.0 mg/dm$^2$, preferably 1.5 to 8.0 mg/dm$^2$, or 2.0 to 6.0 mg/dm$^2$.

It is envisaged in the present invention, that the bimodal random copolymer has an overall migration (OM) of at most 10.0 mg/dm$^2$ and an amount of polymer soluble in hexane (C6 FDA) of below 2.5 wt.-%.

Crystallization:

The bimodal polypropylene random copolymer of the present invention may be characterised by a specific crystallization behaviour, especially by the capability of solidifying in the monoclinic α-structure despite of extremely high cooling rates, i.e. at 400 K/sec or above.

The bimodal polypropylene random copolymer of the present invention maintains a similar level of solidification temperatures at cooling rates up to 400 K/sec, than unimodal propylene random copolymer with the same nucleation system despite having a higher comonomer content and a higher MFR.

Furthermore, the solidification in the monoclinic α-structure is observed at cooling rates of 400 K/sec or above, while unimodal propylene random copolymers with the same nucleation system and produced in single-site catalysis only solidify in the less desired mesomorphic structure.

The bimodal polypropylene random copolymer of the present invention may hence be characterised by a Solidification temperature Ts$_{400}$ of at least 30° C., preferably at least 40° C. and/or a Solidification temperature Ts$_{500}$, determined at a cooling rate of 500 K/sec of at least 30° C., more preferably of at least 35° C.

Polymerization Process

The present invention also discloses a process for polymerizing the bimodal polypropylene random copolymer of the present invention, namely by sequential polymerization in the presence of a metallocene catalyst, wherein a first polypropylene fraction being a propylene homopolymer or a propylene-ethylene random copolymer having an ethylene content in the range of 0.0 to 2.0 wt.-%, is prepared in a bulk phase reactor in a first polymerization stage said first polypropylene fraction is transferred to a second polymerization stage in which a second polypropylene fraction being a propylene-ethylene random copolymer having an ethylene content in the range of 3.0-10.0 wt.-% is prepared in a gas phase reactor (GPR), the mixture of said two polymer fractions being subjected to a deactivation and purification step followed by compounding and incorporation of the at least one nucleating agents.

The bimodal polypropylene random copolymer of the present invention is typically and preferably made in a multistep process well known in the art. A preferred multistage process is a loop-gas phase-process, such as developed by Borealis A/S, Denmark (known as BORSTAR® technology) described e.g. in patent literature, such as in EP-A-0887379 or in WO 92/12182.

The invention preferably relates to the copolymerization of propylene and ethylene, in an at least two step process so as to form a bimodal polypropylene random copolymer. Ideally, the process of the invention employs two main reactors, namely one reactor operating in bulk, and one gas phase reactor.

The process may also utilize a prepolymerization step, taking place in a separate reactor before the two main reactors.

The first polypropylene fraction is being produced in a bulk step, then transferred to the second stage in which the second polypropylene fraction is prepared in a first gas phase reactor (GPR1) in the presence of the first polypropylene fraction.

For bulk and gas phase polymerization reactions, the reaction temperature used will generally be in the range 60 to 115° C. (e.g. 70 to 110° C.), the reactor pressure will generally be in the range 10 to 40 bar for gas phase reactions with bulk polymerization operating at slightly higher pressures. The residence time will generally be 0.25 to 8 hours (e.g. 0.3 to 3 hours).

The MFR2 of the polymer produced in the first stage, being the first polypropylene fraction, may in the range in the range of 1.0-70.0 g/10 min, preferably in the range of 10.0 to 55.0 g/10 min, like the range of 15.0 to 40.0 g/10 min or 20.0-35.0 g/10 min.

the MFR2 of the polymer produced in the second stage, namely second polypropylene fraction, may be indepently of the first one in the range in the range of 1.0-70.0 g/10 min, preferably in the range of 10.0 to 55.0 g/10 min, like the range of 15.0 to 40.0 g/10 min or 20.0-35.0 g/10 min.

The comonomer content of the polymer produced in the first stage, namely the first polypropylene fraction, may be in the range of 0.0 to 2.0 wt.-%, preferably 0.8-1.8 wt.-%; the comonomer content of the polymer produced in the second stage, namely the second polypropylene fraction, may be in the range of 3.0-10.0 wt.-%, like preferably in the range of 3.5-9.0 wt.-%, or in the range of 4.0-7.5 wt.-%, Catalysts:

The bimodal polypropylene random copolymer according to the invention is preferably obtainable by a single-site catalyst, more preferably being obtainable by a metallocene catalyst.

The metallocene catalyst is preferably according to the following formula (I).

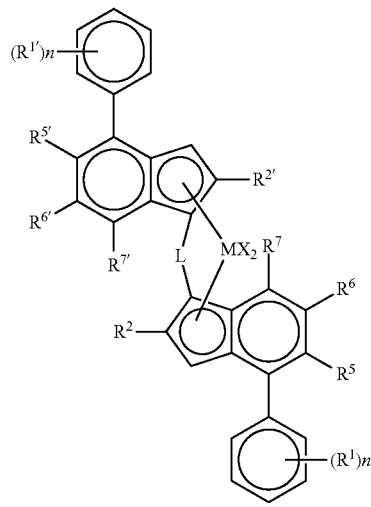

(I)

wherein M is Hf or Zr, preferably Zr,

X is a sigma ligand, preferably each X is independently a hydrogen atom, a halogen atom, C1-C6-alkoxy group, C1-C6-alkyl, phenyl or benzyl group, more preferably each X is independently Cl or a methyl group and most preferably each X is either Cl or a methyl group;

L is a bridge of the formula —SiR$^8_2$—, wherein each R$^8$ is independently a C1-C20-hydrocarbyl group, tri(C1-C20-alkyl)silyl, preferably each R$^8$ is independently a C1-C20-linear, branched or cyclic alkyl group, a C6-C20-aryl, C7-C20-arylalkyl or C7-C20-alkylaryl group, more preferably a C1-C20-linear, branched or cyclic alkyl group, even more preferably a linear or branched C1-C20 alkyl group or a C3-C10 cycloalkyl group, even more preferably a linear or branched C1-C6 alkyl group or a C3-C7 cycloalkyl group, e.g. methyl, ethyl, n-propyl, i-propyl, n-butyl or tert.butyl, even more preferably, both R$^8$ are the same and are selected from methyl, ethyl, npropyl, i-propyl, n-butyl or tert.-butyl, even more preferably methyl or ethyl, even more preferably both Ware methyl;

n is 0, 1 or 2, preferably 1 or 2 and most preferably 1;

R$^1$ and R$^{1'}$ are the same or can be different and can be a linear or branched C1-C6-alkyl group, preferably linear or branched C1 to C4 alkyl group, e.g. methyl, tert.-butyl;

R$^2$ and R$^{2'}$ are the same or can be different and are a CH2-R$^9$ group, with R$^9$ being H or linear or branched C1-C6-alkyl group, more preferably H or linear or branched C1-C3-alkyl, most preferably H;

R$^5$ and R$^{5'}$ are the same or are different and can be H or a linear or branched C1-C6-alkyl group, e.g. methyl, ethyl, n-propyl, i-propyl, n-butyl, i-butyl, sec.-butyl and tert.butyl, or a OR group, wherein R is a C1-C6-alkyl group, R$^5$ and R$^{5'}$ are preferably H or a linear or branched C1-C4-alkyl group or a OR group, wherein R is a C1-C3-alkyl group;

R$^6$ and R$^{6'}$ are the same or are different and can be H or a C(R$^{10}$)3 group, with R$^{10}$ being the same or different and R$^{10}$ can be H or a linear or branched C1-C6-alkyl group, R$^6$ and R$^{6'}$ are preferably H or a C(R$^{10}$)$_3$ group, with R$^{10}$ being the same or different and R$^{10}$ can be a linear or branched C1- to C3-alkyl group;

or R$^5$ and R$^6$ and/or R$^{5'}$ and R$^{6'}$ taken together form an unsubstituted 4-7 membered ring condensed to the benzene ring of the indenyl moiety, preferably form an unsubstituted 5-6 membered ring condensed to the benzene ring of the indenyl moiety; and R$^7$ and R$^{7'}$ can be the same or are different and can be H or a linear or branched C1-C6-alkyl group, more preferably H.

The single-site metallocene complex, especially the complexes defined by the formula (I) specified in the present invention, used for manufacture of the bimodal polypropylene random copolymer are symmetrical or asymmetrical. For asymmetrical complexes that means that the two indenyl ligands forming the metallocene complex are different, that is, each indenyl ligand bears a set of substituents that are either chemically different, or located in different positions with respect to the other indenyl ligand. More precisely, they are chiral, racemic bridged bis-indenyl metallocene complexes. Whilst the complexes of the invention may be in their syn-configuration, ideally they are in their anti-configuration. For the purpose of this invention, racemic-anti means that the two indenyl ligands are oriented in opposite directions with respect to the cyclopentadienyl-metalcyclopentadienyl plane, while racemic-syn means that the two indenyl ligands are oriented in the same direction with respect to the cyclopentadienyl-metal-cyclopentadienyl plane, as shown in the FIGURE below.

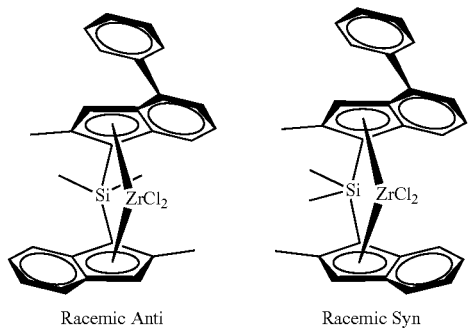

Racemic Anti          Racemic Syn

Formula (I) is intended to cover both, syn- and anti-configurations. By nature of their chemistry, both anti and syn enantiomer pairs are formed during the synthesis of the complexes. However, by using the ligands of this invention, separation of the preferred anti-isomers from the syn-isomers is straightforward.

It is preferred that the metallocene complexes of the invention are employed as the racemic anti-isomer. Ideally therefore at least 95% mol, such as at least 98% mol, especially at least 99% mol of the metallocene catalyst is in the racemic anti isomeric form. In a preferred embodiment at least one of the phenyl groups is substituted with at least one of $R^1$ or $R^{1'}$, thus n can be 0 only for one of the ligands and not for both. If n is 1, then $R^1$ and $R^{1'}$ are preferably on position 4 (para) of the phenyl ring and if n is 2 then $R^1$ and $R^{1'}$ are preferably on positions 3 and 5 of the phenyl ring. Different combinations for $R^1$ and $R^{1'}$ are possible. Preferably both phenyl rings are substituted by $R^1$ and $R^{1'}$, whereby n can be the same or can be different for the two phenyl rings and is 1 or 2.

More preferably in the catalyst according to formula (I) M is Zr,
X is independently a hydrogen atom, a halogen atom, or C1-C6-alkyl, even more preferably each X is independently Cl or a methyl group and most preferably each X is either Cl or a methyl group;
L is a bridge of the formula —$SiR^8_2$—, wherein each $R^8$ is independently a linear or branched C1-C20 alkyl group, even more preferably a linear or branched C1-C6 alkyl group, e.g. methyl, ethyl, n-propyl, i-propyl, n-butyl or tert.-butyl, yet even more preferably, both $R^8$ are the same and are selected from methyl, ethyl, n-propyl, i-propyl, n-butyl or tert.-butyl, still even more preferably methyl or ethyl, most preferably both R8 are methyl;
n is 1 or 2, most preferably each n is 1;
$R^1$ and $R^{1'}$ are the same or can be different and can be a linear or branched C1 to C4 alkyl group, e.g. methyl, tert.-butyl;
$R^2$ and $R^{2'}$ are the same or can be different and are a CH2-$R^9$ group, with $R^9$ being H or linear or branched C1-C3-alkyl, most preferably H;
$R^5$ and $R^{5'}$ are the same or are different and can be H or a linear or branched C1-C4-alkyl group, e.g. methyl, ethyl, n-propyl, i-propyl, n-butyl, i-butyl, sec.-butyl and tert.butyl, or a OR group, wherein R is a C1-C3-alkyl group;
$R^6$ and $R^{6'}$ are the same or are different and can be H or a $C(R^{10})_3$ group,
with $R^{10}$ being the same or different and $R^{10}$ can be a linear or branched C1-C3-alkyl group; or $R^5$ and $R^6$ and/or $R^{5'}$ and $R^{6'}$ taken together form an unsubstituted 5-6 membered ring condensed to the benzene ring of the indenyl moiety;
and $R^7$ and $R^{7'}$ are H.

In one variant both of $R^5$ and $R^6$ as well as $R^{5'}$ and $R^{6'}$ together form an unsubstituted 4-7, preferably 5-6 membered ring condensed to the benzene ring of the indenyl moiety and, optionally and preferably, $R^2$ and $R^{2'}$ each is a C1 to C4 alkyl group, more preferably methyl group.

More preferably both of $R^5$ and $R^6$ as well as $R^{5'}$ and $R^{6'}$ form an unsubstituted 5 membered ring condensed to the benzene ring of the indenyl moiety and optionally and preferably, $R^2$ and $R^{2'}$ each are a methyl group.

In another variant it is also possible that at both ligands $R^5$ and $R^6$ as well as $R^{5'}$ and $R^{6'}$ are hydrogen.

Still a further possibility is that only one of the ligands is unsubstituted in position 5 and 6. In other words, either $R^5$ and $R^6$ or $R^{5'}$ and $R^{6'}$ are hydrogen.

Articles:

The bimodal polypropylene random copolymer of the present invention is especially suitable for producing moulded article, like injection moulded articles, for various applications.

The bimodal polypropylene random copolymer according the invention is useful for producing articles comprising the nucleated polypropylene composition, which—during their production processes—undergo extremely high cooling rates in the range of 200 K/s or even higher, such as extruded films, preferably produced via cast film extrusion, blown films, especially those produced via water-quenched blown film-technology, or steel belt technology, also called "sleeve touch technology".

It is further beneficial to use the process described herein for producing coatings comprising the nucleated polypropylene composition according the invention on various substrates, e.g. metal sheets, metal cables, metal wires or films, where such high cooling rates as described herein can be applied.

The α-nucleated polypropylene composition according the invention is further useful for producing articles, which—once available in their final form— undergo thermal treatment above 60° C., as e.g. in sterilisation, steam-sterilisation or pasteurisation processes. Examples for such articles are e.g. protective packaging for medical and/or health-care-related articles, or packaging for food wrapping, or the like.

EXAMPLES

Measuring Methods
Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_2$ of polypropylene is determined at a temperature of 230° C. and a load of 2.16 kg.

The MFR of the second fraction, produced in the second reactor is determined according to $$\log(MFR(F2)) = \frac{\log(MFR(BPR)) - w(F1) * \log(MFR(F1))}{w(F2)} \quad \text{Eq. (II)}$$

wherein
MFR (BPR) denominates the MFR of the bimodal polypropylene random copolymer,
w(F1) and w(F2) denominate the weight fractions of the first polypropylene fraction and second polypropylene fraction respectively
MFR(F1) denominates the MFR of the first polypropylene fraction produced in the first reactor.
Xylene Cold Soluble (XCS)

Xylene Cold Soluble fraction at room temperature (XCS, wt.-%) is determined at 25° C. according to ISO 16152; 5th edition; 2005-07-01.
Hexane Soluble Fraction (C6 FDA)

The amount of hexane extractable polymer according to FDA method (federal registration, title 21, Chapter 1, part 177, section 1520, s. Annex B) was determined from films produced on a PM30 cast film extrusion line with about 220° C. melt temperature with L/D of 20 and a screw diameter of 30 mm (feed zone 4 D long, 5.8 mm deep, compression zone 10 D long, metering zone 6 D long, 2.3 mm deep utilising a screen pack 36-400-900-400 mesh/cm²). A 200 mm die with a 0.55 to 0.60 mm die gap, screw speed: 50 r/min, and chill roll temperature of water: both rolls 40° C. (heating-cooling unit), Air gap: 0.5 mm, Air knife blower air supply: 1 bar. The film thickness is 100 μm.

The amount of hexane soluble polymer is determined according to FDA method (federal registration, title 21, Chapter 1, part 177, section 1520, s. Annex B) from the film samples prepared as described above. The extraction was performed at a temperature of 50° C. and an extraction time of 2 hours.
Overall Migration (OM)

Overall Migration is determined according to EN ISO 1186-14:2002 on injection moulded plaques, 60×60×1 mm³

Flexural Modulus

The flexural modulus was determined in a 3-point-bending test at 23° C. according to ISO 178 on 80×10×4 mm³ test bars injection moulded in line with EN ISO 1873-2.

Notched Impact Strength (NIS):

The Charpy notched impact strength (NIS) was measured according to ISO 179 1eA at +23° C., using injection moulded bar test specimens of 80×10×4 mm³ prepared in accordance with EN ISO 1873-2.

Haze

Haze determined according to ASTM D1003-00 on 60×60×1 mm³ plaques injection moulded in line with EN ISO 1873-2. The injection moulded plaques were produced at a melt temperature of 230° C.

$Haze_1$ denominates a haze value determined on 1 mm thick plaques.

Differential Scanning Calorimetry (DSC)

Differential scanning calorimetry (DSC) analysis, melting temperature ($T_m$) and melt enthalpy ($H_m$), crystallization temperature ($T_c$), and heat of crystallization ($H_c$, $H_{CR}$) are measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_c$) and heat of crystallization ($H_c$) are determined from the cooling step, while melting temperature ($T_m$) and melt enthalpy ($H_m$) are determined from the second heating step.

Throughout the patent the term Tc or (Tcr) is understood as Peak temperature of crystallization as determined by DSC at a cooling rate of 10 K/min (i.e. 0.16 K/sec).

Solidification Temperature ($Ts_{CR}$)

Solidification Temperature ($Ts_{CR}$) is determined in FSC and defines the Crystallization Temperature at a given cooling rate "CR". E.g.: $Ts_{400}$ defines the solidification temperature at a cooling rate of 400 K/sec.

Analogously $Ts_{0.16}$ would hence correspond to the Peak temperature of crystallization as mentioned above.

Further a term "high cooling rate" is to be understood as "fast cooling", e.g. a cooling rate of e.g. 400 K/sec provides faster cooling than a cooling rate of e.g. 100 K/sec.

Heat of Crystallization ($H_c$, $H_{cr}$)

Heat of crystallization (Hc) was determined during the various cooling steps at the indicated cooling rates. With cooling rates up to 0.5 K/s the measurement was done in DSC (cf. above), at cooling rates of 1 K/s or higher the measurement was done in FSC (cf. below).

Fast Scanning Calorimetry (FSC)

A power-compensation-type differential scanning calorimeter Flash DSC1 from Mettler-Toledo was used to analyze isothermally and non-isothermally the crystallization behavior in the range of cooling rates from $10^0$ to $10^3$ K s⁻¹. The instrument was attached to a Huber intracooler TC45, to allow cooling down to about −100° C. The preparation of samples includes cutting of thin sections with thickness of 10 to 15 µm from the surface of pellets. The specimens were heated to 200° C., kept at this temperature for 0.1 s and cooled at different cooling rates to −33° C. which is below the glass transition temperature of the mobile amorphous fraction of iPP. The furnace of the instrument was purged with dry nitrogen gas at a flow rate of 30 mL min'. The sensors were subjected to the so called conditioning procedure which includes several heating and cooling runs.

Afterwards, a temperature-correction of the sensor was performed.

Before loading the sample a thin layer of silicon oil was spread on the heating area of the sample sensor to improve the thermal contact between the sensor and the sample. The sensors are developed by Xensor Integration (Netherlands). Each sensor is supported by a ceramic base plate for easy handling. The total area of the chip is 5.0×3.3 mm²; it contains two separate silicon nitride/oxide membranes with an area of 1.7×1.7 mm² and a thickness of 2.1 mm each, being surrounded by a silicon frame of 300 µm thickness, serving as a heat sink. In the present work additional calibrations were not performed. Further details to the technique as such are given here:

E. Iervolino, A. van Herwaarden, F. van Herwaarden, E. van de Kerkhof, P. van Grinsven, A. Leenaers, V. Mathot, P. Sarro. Temperature calibration and electrical characterization of the differential scanning calorimeter chip UFS1 for the Mettler-Toledo Flash DSC 1. Thermochim. Acta 522, 53-59 (2011).

V. Mathot, M. Pyda, T. Pijpers, G. Poel, E. van de Kerkhof, S. van Herwaarden, F. van Herwaarden, A. Leenaers. The Flash DSC 1, a power compensation twin-type, chip-based fast scanning calorimeter (FSC): First findings of polymers. Thermochim. Acta 552, 36-45 (2011).

M. van Drongelen, T. Meijer-Vissers, D. Cavallo, G. Portale, G. Vanden Poel, R. Androsch R. Microfocus wide-angle X-ray scattering of polymers crystallized in a fast scanning chip calorimeter. Thermochim Acta 563, 33-37 (2013).

Description of Quantitative $^{13}C$ NMR Spectroscopy

Quantitative nuclear-magnetic resonance (NMR) spectroscopy was used to quantify the comonomer content of the polymers, comonomer dyad sequence distribution and sequence order parameter quantification.

Quantitative $^{13}C\{^1H\}$ NMR spectra were recorded in the solution-state using a Bruker Avance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Comonomer Content Quantification of Poly(Propylene-Co-Ethylene) Copolymers

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed (Cheng, H. N., Macromolecules 17 (1984), 1950) and the comonomer fractions calculated as the fraction of ethylene and propylene in the polymer with respect to all monomer in the polymer:

$$fE=E/(P+E)$$

$$fP=P/(P+E)$$

The comonomer fraction was quantified using the method of Wang et. al. (Wang, W.-J., Zhu, S., Macromolecules 33 (2000), 1157) through integration of multiple signals across the whole spectral region in the $^{13}C\{^1H\}$ spectra.

The mole percent comonomer incorporation was calculated from the mole fraction:

$$E[mol\ \%]=100*fE$$

The weight percent comonomer incorporation was calculated from the mole fraction:

$$E[wt.-\%]=100*(fE*28.06)/((fE*28.06)+((1-fE)*42.08))$$

Comonomer Dyad Sequences Determination

Comonomer sequence distribution was quantified at the dyad level using the characteristic signals corresponding to the incorporation of ethylene into propylene-ethylene copolymers (Cheng, H. N., Macromolecules 17 (1984), 1950). Integrals of respective sites were taken individually, the regions of integration described in the article of Wang et. al. were not applied for dyad sequence quantification.

It should be noted that due to overlapping of the signals of Tβδ and Sγγ, the compensation equations were applied for integration range of these signals using the sites Sβδ and Sγδ:

$$S\gamma\gamma=(I(S\beta\delta)-I(S\gamma\delta))/2$$

$$T\beta\delta=I(T\beta\delta+S\gamma\gamma)-(I(S\beta\delta)-I(S\gamma\delta))/2$$

The constitutive equations were:

$$EP=2*T\delta\delta+T\beta\delta=2*I(T\delta\delta)+I(T\beta\delta+S\gamma\gamma)-(I(S\beta\delta)-I(S\gamma\delta))/2$$

$$EE=S\gamma\gamma+S\gamma\delta+(S\delta\delta-S\gamma\delta/2)/2=0.5*I(S\beta\delta)+0.5*I(S\delta\delta)+0.25*I(S\gamma\delta)$$

$$PP=T\beta\delta/2+T\beta\beta=0.5*(I(T\beta\delta+S\gamma\gamma)-(I(S\beta\delta)-I(S\gamma\delta))/2)+I(T\beta\beta)$$

Note that for simplicity the two indistinguishable reversible PE and EP dyads are termed EP i.e. EP=PE+EP. The mole fraction of each dyad was determined through normalisation to the sum of all dyads.

$$XX=PP+EP+EE$$

$$fPP=PP/XX$$

$$fEP=EP/XX$$

$$fEE=EE/XX$$

Material Description:
Catalyst for P1 and P2:

The catalyst for the bimodal polypropylene random copolymer was rac-anti-Me$_2$Si(2-Me-4-(p-tBuPh)-lnd)(2-Me-4-Ph-5-OMe-6-tBu-Ind)ZrCl$_2$ prepared as described in WO2013007650.

Preparation of the Solid Catalyst System

Inside the glovebox, 80 μL of a dry and degassed mixture of perfluoroalkylethyl acrylate ester were mixed in a septum vial with 2 mL of a 30 wt.-% solution of MAO in toluene and left to react overnight. The following day, 58.9 mg of the metallocene of the invention rac-rac-anti-Me$_2$Si(2-Me-4-(p-tBuPh)-lnd)(2-Me-4-Ph-5-OMe-6-tBu-Ind)ZrCl$_2$ (0.076 mmol, 1 equivalent) were dissolved with 4 mL of the MAO solution in another septum bottle and left to stir inside the glovebox. After 60 minutes, the 4 mL of the MAO-metallocene solution and 1 mL of the perfluoroalkylethyl acrylate ester mixture in MAO solution were successively added into a 50 mL emulsification glass reactor containing 40 mL of hexadecafluoro-1,3-dimethylcyclohexane kept at −10° C. and equipped with an overhead stirrer (stirring speed=600 rpm). Total amount of MAO is 5 mL (300 equivalents). A red emulsion formed immediately (measured emulsion stability=16 seconds) and was stirred during 15 minutes at 0° C./600 rpm. Then the emulsion was transferred via a 2/4 teflon tube to 100 mL of hot hexadecafluoro-1,3-dimethylcyclohexane heated to 90° C., and stirred at 600 rpm until the transfer is completed. The speed was reduced to 300 rpm. After 15 minutes stirring, the oil bath was removed and the stirrer turned off. The catalyst was left to settle up on top of the hexadecafluoro-1,3-dimethylcyclohexane and after 35 minutes the solvent was siphoned off. The remaining red catalyst was dried during 2 hours at 50° C. over an argon flow. 0.62 g of a red free flowing powder was obtained.

The polymerization of P1 and P2 and P4 was performed in a Borstar PP pilot plant unit with liquid phase prepolymerization unit, bulk loop reactor and a gas phase reactor in series. Table 1 summarizes the polymerization data.

P3 as used in CE1 and CE2 is a unimodal PP-random copolymer produced with the same catalyst as IE1 and IE2 but in a single step in a 5 l bench-scale reactor.

P4 as used in CE3 is a random copolymer based on a non-phthalate Ziegler-Natta type catalyst identical to the inventive example IE2 of WO 2014/187687 A1, having a MFR of about 40 g/10 min and a comonomer content of ca. 3.5 wt.-%, produced based on Ziegler-Natta-catalysis.

The polymers P1, P2 and P4 were compounded in a co-rotating twin-screw extruder Coperion ZSK 57 at 220° C. with 0.15 wt.-% of Irganox B215 (1:2-blend of Irganox 1010 (Pentaerythrityl-5 tetrakis(3-(3',5'-di-tert.butyl-4-hydroxy-toluyl)-propionate and tris (2,4-di-t-butylphenyl) phosphate) phosphite) of BASF AG, Germany) and 0.05 wt.-% calcium stearate and 0.1 wt.-% of glycerine-monostearate. In case of P4, 2 wt.-% of a propylene homopolymer having an MFR of 20 g/10 min and 200 ppm of poly(vinyl cyclohexane) was added additionally, as in IE4 of WO 2014/187687 A1.

For compounding P3 a smaller ThermoPRISM TSE 16 twin screw extruder was used, incorporating 0.15 wt.-% of Irganox B215 (1:2-blend of Irganox 1010 (Pentaerythrityl-5 tetrakis(3-(3',5'-di-tert.butyl-4-hydroxytoluyl)-propionate and tris (2,4-di-t-butylphenyl) phosphate) phosphite) of BASF AG, Germany) and 0.05 wt.-% calcium stearate and 0.1 wt.-% of glycerine-monostearate as mentioned above.

IE1 and IE2 as well as CE2 and CE3 further contained
- 2000 ppm of NA88A-HD, being Bis (3,4-di-methyl-benzylidene)sorbitol (DMDBS), commercially available by Palmarole. and
- 2 wt.-% Nucleating-Masterbatch (NU-MB), being a propylene-homopolymer, MFR 20 and comprising ca. 200 ppm of a polymeric nucleating agent, namely PVCH.

CE1 contained 2000 ppm of NA88A-HD as sole nucleating agent.

TABLE 1

Polymerization Details of the inventive base polymers P1 and P2 and comparative P3

|  |  | P1 IE1 | P2 IE2 | P3 CE1 + CE2 | P4 CE3 |
|---|---|---|---|---|---|
| Prepoly reactor Temperature | °C. | 20.0 | 20.0 |  | 30.0 |
| Catalyst feed | g/h | 0.6 | 1.2 |  | 0.4 |
| Residence time Loop | h | 0.4 | 0.4 |  | 0.3 |
| Temperature | °C. | 70.0 | 75.0 |  | 70.0 |
| H2/C3 | mol/kmol | 0.5 | 0.5 |  | 4.8 |
| C2/C3 | mol/kmol | 25.1 | 0.0 |  | 8.0 |
| Polymer Split | Wt.-% | 46.4 | 32.7 |  | 47 |
| MFR2 | g/10 min | 24.9 | 38.1 |  | 43.0 |
| C2 Loop (NMR) | Wt.-% | 1.3 | 0.0 |  | 2.7 |
| XCS Loop | Wt.-% | 0.8 | 0.6 |  | 7.5 |
| GPR1 |  |  |  |  |  |
| Temperature | °C. | 80.0 | 80.0 |  | 86.0 |
| H2/C3 | mol/kmol | 6.6 | 7.9 |  | 56.9 |
| C2/C3 | mol/kmol | 141 | 192 |  | 22.1 |
| C2 in GPR1 (Co(2)) | Wt.-% | 6.1 | 8.0 |  | 4.3 |
| Polymer Split | Wt.-% | 53.6 | 67.3 |  | 53 |
| MFR2 in GPR1 | g/10 min | 34.0 | 27.0 |  | 38.0 |
| Final polymer: |  |  |  |  |  |
| MFR2 total | g/10 min | 29.5 | 31.6 | 6.0 | 40.0 |
| C2 total (NMR) | Wt.-% | 3.9 | 5.4 | 2.3 | 3.5 |
| Co(2)/Co(total) | % | 1.56 | 1.48 |  | 1.22 |
| XCS total | Wt.-% | 2.3 | 9.8 | 2.0 | 8.1 |
| Mw | kg/mol | 150 | 145 |  | 160 |
| Mw/Mn | — |  | 2.6 | 2.7 | 4.3 |
| Tg | °C. | −3 | −4 |  | −4.7 |

TABLE 2

NMR-results of the Inventive and Comparative examples

|  |  | P1 IE1 | P2 IE2 | P4 CE3 |
|---|---|---|---|---|
| C2 total | Wt.-% | 5.4 | 3.9 | 3.5 |
| C2 total | mol % | 7.9 | 5.6 | 5.2 |
| <PEP> norm. | % | 45.4 | 61.7 | 65.3 |
| <EEE> | mol % | 2.9 | 0.5 | 0.6 |
| <EEP> | mol % | 1.3 | 1.6 | 1.4 |
| <PEP> | mol % | 3.5 | 3.4 | 3.8 |
| <PPP> | mol % | 84.1 | 85.3 | 85.9 |
| <EPP> | mol % | 7.8 | 8.8 | 6.7 |
| <EPE> | mol % | 0.5 | 0.5 | 0.3 |

TABLE 3

Physical characterisation of the inventive and comparative examples

|  |  | IE1 | IE2 | CE1 | CE2 | CE3 |
|---|---|---|---|---|---|---|
| P1 |  | 97.5 |  |  |  |  |
| P2 |  |  | 97.5 |  |  |  |
| P3 |  |  |  | 99.5 | 97.5 |  |
| P4 |  |  |  |  |  | 97.5 |
| DMDBS | wt.-% | 0.2 | 0.2 | 0.2 | 0.2 | 0.2 |
| NU-MB |  | 2 | 2 |  | 2 | 2 |
| MFR | g/10 min | 37 | 37 | 4 | 4 | 40 |
| Tc | °C. | 118 | 126 | 109 | 112 | 120 |
| Tm1 | °C. | 147 | 155 | 139 | 142 | 149 |
| Tm2 | °C. | 134 | 111 | 129 | 129 | 136 |
| Hm1 | J/g | 21.4 | 45.2 | 13 | 13 | 28 |
| Hm2 | J/g | 67.9 | 35 | 74 | 76 | 64 |

TABLE 3-continued

Physical characterisation of the inventive and comparative examples

|  |  | IE1 | IE2 | CE1 | CE2 | CE3 |
|---|---|---|---|---|---|---|
| C6 FDA | wt.-% | 1.0 | 1.9 | n.d. | n.d. | 2.8 |
| Haze (230° C. melt temp.) | % | 6.0 | 8.1 |  |  | 9.3 |
| NIS | kJ/m² | 3.9 | 4.2 |  |  | 4.5 |
| Flex | MPa | 1186 | 1031 |  |  | 988 |
| OM | mg/dm2 | 2.6 | 5.5 |  |  | 10.4 |

TABLE 4

Crystallization temperature (Tc) at increasing cooling rates, i.e. Solidification Temperature $T_{SCR}$

| Cooling rate [K/sec] | IE1 | IE2 | CE1 | CE2 | CE3 |
|---|---|---|---|---|---|
| 0.16 | 118 | 126 | 109 | 112 | 120 |
| 1 | 106 | 111 | 94 | 101 | 102 |
| 2 | 102 | 106 | 90 | 97 | — |
| 3 | 99 | 102 | 88 | 95 | 97 |
| 4 | 97 | 101 | 86 | 94 | 94 |
| 5 | 95 | 99 | 84 | 93 | 91 |
| 6 | 94 | 97 | 83 | 91 | 90 |
| 7 | 93 | 96 | 82 | 90 | 89 |
| 8 | 92 | 94 | 81 | 89 | 88 |
| 9 | 92 | 94 | 81 | 88 | 86 |
| 10 | 90 | 92 | 80 | 88 | 85 |
| 20 | 84 | 85 | 79 | 82 | 84 |
| 30 | 80 | 80 | 68 | 78 | 81 |
| 40 | 76 | 76 | 65 | 75 | 75 |
| 50 | 73 | 73 | 62 | 73 | 72 |
| 60 | 71 | 70 | 60 | 70 | 70 |
| 70 | 68 | 66 | 58 | 69 | 65 |
| 80 | 66 | 64 | 56 | 66 | 59 |
| 90 | 63 | 61 | 54 | 63 | 58 |
| 100 | 61 | 61 | 52 | 60 | 55 |
| 200 | 52 | 48 | 51 | 52 | 50 |
| 300 | 47 | 44 | 47 | nmc* | nmc |
| 400 | 44 | 40 | nmc | nmc | nmc |
| 500 | 40 | 40 | nmc | nmc | nmc |

*nmc: non-monoclinic crystallization

The results show, that the inventive examples IE1 and IE2 have a higher crystallization temperature, good mechanical properties in the sense of good stiffness and impact, and low haze value.

Further the inventive examples have better quenching resistance when exposed to high cooling rates and low amounts of extractable polymers when extracted in hexane according to FDA method or in the sense of an low overall migration (OM).

The invention claimed is:
1. A bimodal polypropylene random copolymer of propylene and 2.5-7.0 wt. % of ethylene as comonomer produced in the presence of a single site based catalyst, having a Melt Flow Rate 20.0-120.0 g/10 min when determined according to ISO1133 at 230° C. and 2.16 kg and comprising
   a. 25.0-70.0 wt. % of a first polypropylene fraction being a propylene homopolymer or a random copolymer of propylene and ethylene as comonomer comprising up to 2.0 wt. % of comonomer and
   b. 30.0-75.0 wt. % of a second polypropylene fraction being a random copolymer of propylene and ethylene as comonomer comprising 3.0-10.0 wt. % of comonomer,
and wherein the bimodal polypropylene random copolymer is characterised by a

Crystallization Temperature (Tc) according to ISO 11357 of at least 115° C. and 2.0-15.0 wt. % of the bimodal polypropylene random copolymer being soluble in cold xylene (XCS) when measured according to ISO 16152.

2. The bimodal polypropylene random copolymer according to claim 1, having a hexane-soluble fraction of at most 2.5 wt. % when determined according to FDA method (C6 FDA) and/or by an overall migration (OM) of at most 10.0 mg/dm$^2$ when determined according to EN ISO 1186.

3. The bimodal polypropylene random copolymer according to claim 1, comprising at least one nucleating agent.

4. The bimodal polypropylene random copolymer according to claim 1, having a molecular weight distribution MWD of 2.0-4.0.

5. The bimodal polypropylene random copolymer according to claim 1, having a Solidification temperature Ts$_{400}$ at a cooling rate of 400 K/s of at least 30° C.

6. The bimodal polypropylene random copolymer according to according to claim 1, further comprising a soluble nucleating agent and a particulate nucleating agent.

7. The bimodal polypropylene random copolymer according to claim 1, wherein the soluble nucleating agent is present in the range of 100-3000 ppm based on the bimodal polypropylene random copolymer.

8. A moulded article comprising the bimodal polypropylene random copolymer according to claim 1.

9. The moulded article according to claim 8, wherein the moulded article is a medical, pharmaceutical or diagnostic article.

10. A process for preparing a bimodal polypropylene random copolymer according to claim 1, by sequential polymerization in the presence of a metallocene catalyst, wherein preparing in a bulk phase reactor in a first polymerization stage a first polypropylene fraction, said first polypropylene fraction being a propylene homopolymer or a propylene-ethylene random copolymer having an ethylene content in the range of 0.0 to 2.0 wt. %, transferring said first polypropylene fraction to a second polymerization stage in which a second polypropylene fraction is prepared in a gas phase reactor (GPR), said second polypropylene fraction being a propylene-ethylene random copolymer having an ethylene content in the range of 3.0-10.0 wt. %, wherein a mixture of said first polypropylene fraction and said second polypropylene fraction being subjected to a deactivation and purification step followed by compounding and incorporation of the at least one nucleating agents.

11. The process according to claim 10, wherein a particulate nucleating agent is incorporated by using a nucleation masterbatch.

* * * * *